May 5, 1964
L. H. WALKER
3,132,012
COLD STORAGE ROOM ATMOSPHERE CONTROL METHOD
Filed Oct. 12, 1959
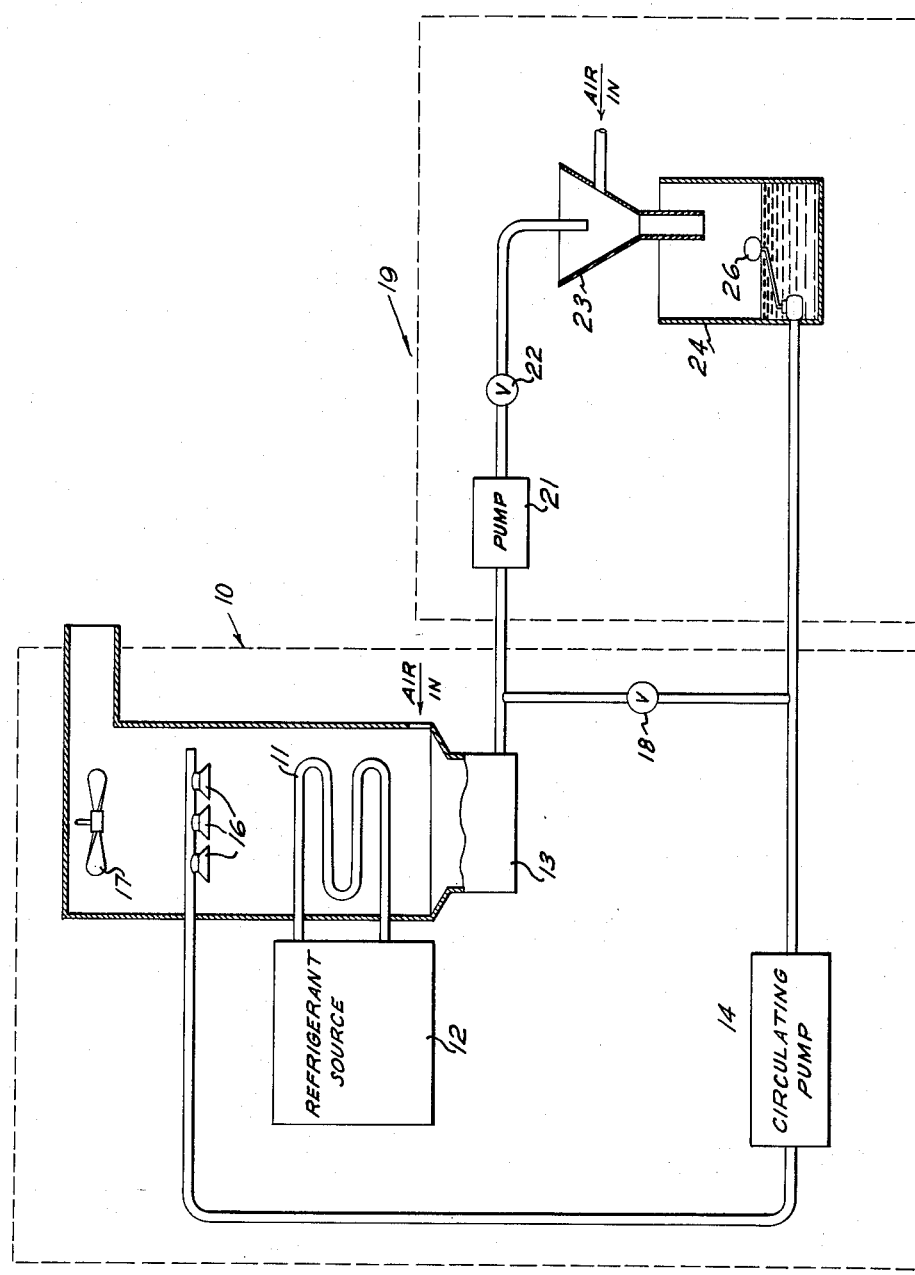
INVENTOR.
LEANDER H. WALKER
BY
Gardner & Zimmerman
ATTORNEYS 3,132,012
COLD STORAGE ROOM ATMOSPHERE
CONTROL METHOD
Leander H. Walker, 23 The Crescent, Berkeley 8, Calif.
Filed Oct. 12, 1959, Ser. No. 845,956
6 Claims. (Cl. 55—48)

The present invention relates generally to the controlled atmosphere storage of fruit and the like, and is particularly directed to an improved method for removing carbon dioxide, other gases, odors, and the like from the atmosphere of controlled atmosphere storage rooms.

The term "controlled atmosphere storage" as used herein refers to the cold storage of fruit and the like in a sealed room in such a manner that the respiration rate thereof is materially reduced with an attendant reduction in the rate of ripening and marked increase in the time the fruit can be held in storage. Basically, fruit breathes in oxygen and exhales carbon dioxide in substantially the same manner as animals. It has been found that the rate of this respiration can be subdued by appropriate control of the carbon dioxide and oxygen concentrations in the atmosphere within which the fruit is stored. Controlled atmosphere storage hence essentially consists in allowing the concentration of carbon dioxide exhaled from fruit to the surrounding atmosphere of a sealed cold storage room to rise to a predetermined desired level and allowing the concentration of oxygen inhaled by the fruit from the room atmosphere to fall to a predetermined low level. Thereafter the desired levels of carbon dioxide and oxygen concentrations are held within close limits. In general, depending upon the particular type and variety of fruit, the rooms are operated at carbon dioxide levels of about 2 to 6% and oxygen levels of about 2 to 8%, with tolerances of ±0.2%. It takes about 1 to 3 days for the carbon dioxide to build up to the desired level and about 10 to 20 days for the oxygen to fall to the desired level.

The principal problem encountered in the operation of controlled atmosphere storage rooms is that of holding down the carbon dioxide concentration to the desired level and within close limits under conditions of variable carbon dioxide production by the fruit. While a room is coming into equilibrium, the rate of carbon dioxide production is continually falling, first as the concentration of carbon dioxide builds up in the room atmosphere, and later as the oxygen concentration gradually falls to the desired level. Hence, the variation in the rate of carbon dioxide production prior to the attainment of equilibrium conditions is substantial and the maintenance of a desired level of concentration within close limits is consequently difficult.

Heretofore, the maintenance of the desired concentration of carbon dioxide in the cold storage atmosphere has necessitated gas analysis and proportionate lye scrubbing three or four times each twenty-four hour period in order to hold the desired operating tolerances. Lye scrubbing is usually accomplished by pumping a lye solution through a lye scrubber located within the cold storage room itself. The lye is usually sprayed into the flow stream of the room gases which are conventionally cooled and circulated around the room. The lye falls to a sump and flows by gravity from the room to a tank outside. The amount of lye used is calculated based upon the gas analysis and gas volume in the room. Within the scrubber area, the lye in the solution reacts with the carbon dioxide in the room atmosphere to form sodium carbonate and later to form sodium bicarbonate in suitable proportions to reduce the carbon dioxide concentration to the predetermined operating level. Spent lye solution is dumped at the end of each scrubbing period and a fresh solution made up for the next period. Notwithstanding the considerable time and effort expended in the scrubbing process, such a process is also hazardous to personnel by virtue of the lye employed. Moreover, it is impossible to clean plugged nozzles as the scrubber is located within the sealed room. Maintaining air integrity in the room is difficult with gravity return lines. Spent lye solutions tend to form hard cakes within lines and nozzles, eventually plugging them unless extreme care is used in operating procedures. Lye-containing mist is usually deposited upon exposed fruit, thereby injuring it. The cost of labor and materials required in the lye scrubbing process is considerable. Other gases generated by the fruit, wood odors and other odors are not removed from the room in sufficient quantity by lye scrubbing to prevent the buildup of strong and obnoxious off odors during the period of storage. The use of carbon filters is thereby necessitated in the room to absorb these gases and odors.

I have found an improved method for simply and effectively controlling the carbon dioxide concentration in controlled atmosphere storage which eliminates all of the foregoing disadvantages and inadequacies of the lye scrubbing heretofore conventionally employed for this purpose. In accordance with my invention, the refrigerating fluid of the usual open wet coil system employed in the refrigeration of cold storage rooms may be utilized to great advantage as an agent for removing carbon dioxide in controlled amounts, as well as other gases and odors from the room atmosphere. Such utilization of the existing cold storage room refrigeration facilities according to my controlled atmosphere storage control method results in a material simplification in the corresponding apparatus employed for cold storage atmosphere control as well as other advantages.

It is therefore a principal object of the present invention to provide a materially simplified method for controlled atmosphere storage control.

Another object of this invention is the provision of a controlled atmosphere storage control method by simple modification of existing cold storage refrigeration facilities.

Still another object of the present invention is to provide for the removal of carbon dioxide in controlled amounts as well as other gases and odors from a cold storage atmosphere simultaneously with but one simple control system.

Yet another object of this invention is to facilitate controlled atmosphere storage with a simplicity and economy heretofore unrealizable.

It is a further object of the present invention to provide controlled atmosphere storage control by external scrubbing of the refrigerating fluid commonly used as an aid in heat transfer between the room atmosphere and the refrigerant coils present in the room.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The single figure is a schematic flow diagram of a conventional open, wet coil refrigeration system for cold storage room refrigeration as modified according to the present invention to facilitate controlled atmosphere storage control.

Referring now to the drawing, there is seen to be provided a conventional open, wet coil system 10 including cooling coils 11 through which a refrigerant from a source 12 is circulated. In such a system a refrigerating fluid, e.g., water, brine, or the like is circulated over the coils 11 in a direction counterflow to that of the air or gas being circulated in the cold storage room. More specifically, the refrigerating fluid is collected in a sump 13 disposed beneath the coils and pumped by means of a circulating pump 14 to spray nozzles 16 located above the coils and sump. The fluid is sprayed from the nozzles 16 and the spray coalesces and flows down over the coils and thence to the sump for recirculation. The room gases are sucked up through the coils and spray area in flow opposition to the spray as by means of a fan 17 disposed above the spray nozzles 16. The fan then blows the gases along the top of the cold storage room and establishes a continuous circulation of the gases about the room and through the spray of refrigerating fluid. The room gases are thus intimately mixed with the fluid and cooled in passage through the spray to in turn cool the entire atmosphere of the cold storage room. The amount of cooling may be controlled by controlling the quantity of refrigerant supplied to coil 11.

I have found that where the storage room is sealed for controlled atmosphere storage, the refrigerating fluid is capable of absorbing substantial quantities of carbon dioxide, other gases, and odors generated to the room atmosphere during the normal cold storage of fruit or the like therein. This is due to the concentration of gases within the sealed controlled atmosphere storage room being much higher than in atmospheric air and because the solubility of any gas in a liquid varies with the concentration of the particular gas in the atmosphere above the liquid. For example, the solubility of carbon dioxide in water at 32° Fahrenheit from an atmosphere containing 5% carbon dioxide is approximately 500 times that from an atmosphere of ordinary air.

By virtue of these circumstances, the refrigerating fluid of the existing open wet coil refrigeration system 10 may be effectively utilized as an agent for the removal of carbon dioxide from the cold storage room atmosphere to thereby effect controlled atmosphere storage. According to the method of the present invention refrigerating fluid is continuously withdrawn from the system 10, scrubbed to remove the carbon dioxide and other gases and odors therefrom, and thereafter returned to the system 10 for recirculation and absorption of more gas. Scrubbing of the fluid is preferably accomplished by intimately mixing the fluid with atmospheric air, such air absorbing a substantial portion of the carbon dioxide and the like dissolved in the fluid. The air is thereafter separated from the fluid prior to reapplication to the refrigeration system 10. The amount of refrigerating fluid withdrawn per unit time is regulated such that the rate of circulation in the system 10 is not materially affected. This amount is further adjusted to effect removal of carbon dioxide from the atmosphere in the necessary proportions to maintain the predetermined desired level of carbon dioxide concentration in the atmosphere within close limits. The flow rate of withdrawn fluid is accordingly preferably adjusted relative to the flow rate of air mixed therewith to produce absorption of an amount of carbon dioxide per unit time that just balances the amount produced by respiration of the fruit stored in the room.

It will be appreciated that controlled atmosphere storage temperature control according to the method of the present invention outlined above may be readily accomplished by simple modification of the existing refrigeration system 10. More specifically, preferred apparatus for conducting the method merely comprises a simple auxiliary flow system 19 for scrubbing or degassing fluid withdrawn from refrigeration system 10 preferably at a point between sump 13 and pump 14. The flow system 19 is consequently advantageously paralleled with valve 18 and includes a centrifugal pump 21 or equivalent means for withdrawing the refrigerating fluid from system 10. Following the pump there is provided a valve 22, preferably of the throttling type, to control the flow rate of fluid through system 19. A water eductor 23 is in turn connected to the valve 22 to suck in and intimately mix atmospheric air with the fluid pumped therethrough and thereafter discharged into a tank 24 wherein the air is allowed to separate from the fluid. The eductor 23 may be any one of several known types which depend upon the flow of fluid through a venturi-type device to produce air suction into the fluid. The eductor is preferably selected to have a large air to water operating ratio such that substantial proportions of carbon dioxide are absorbed in said air.

A float valve 26 is provided in the tank 24 to facilitate fluid egress therefrom and is adjusted so that the fluid level in the tank is maintained constant at a safe minimum distance above the float valve outlet. The valve 26 is in turn communicably connected to the intake of circulating pump 14 of refrigeration system 10 to provide return flow of fluid, as by gravity, from the tank 24 to the refrigeration system.

In the operation of my unique, simple controlled atmosphere storage control system, the pump 21 is turned on and valves 18 and 22 are adjusted to produce flow of refrigeration fluid in system 10 and auxiliary flow system 19 in accordance with the considerations detailed hereinbefore relative to the method of the invention. Such system is actuated at full capacity as soon as the atmosphere within the cold storage room reaches the desired level of carbon dioxide concentration and is left in continuous operation for the entire length of the storage period. Full capacity is selected to accommodate the maximum output of carbon dioxide expected from a room of given fruit storage capacity when the carbon dioxide concentration first reaches the desired level. Hence thereafter as the rate of carbon dioxide production from respiration gradually drops off during the period of reduction in oxygen concentration, valve 22 is gradually throttled to reduce the flow of fluid through the eductor 23 and tank 24, which may be termed a "decarbonator." The amount of resulting degassed fluid recirculated to refrigeration system 10 per unit time is correspondingly reduced as is the capacity of the fluid to absorb carbon dioxide from the room atmosphere. The amount of carbon dioxide removed from the atmosphere is attendantly reduced and the carbon dioxide level is maintained at a constant figure. After the fruit in the room has come to equilibrium, further adjustment of valve 22 is unnecessary as the rate of respiration has reached a constant figure. The same purpose may of course be served by leaving the decarbonator flow system at full flow capacity and shutting down for short periods of time as calculated from gas analysis data.

Although the invention has been previously detailed herein with particular respect to adapting open wet coil refrigeration systems commonly used to refrigerate many cold storage rooms to serve the additional purpose of absorbing gases and odors from the room to facilitate control of the atmosphere therein, the principles of the invention are equally as applicable to the control of the atmosphere of cold storage rooms wherein other than an open wet coil system is provided for refrigeration. More specifically, in rooms cooled for example by dry coil units where refrigerating fluid is not employed as a heat transfer medium, a separate absorption system embodying the principles hereinbefore disclosed may be employed to facilitate controlled atmosphere storage. In this connection, an absorption system including for example spray nozzles, sump underlying the nozzles and containing water, brine, or equivalent absorbing agent, a pump connected to the nozzles to supply the absorbing agent thereto, and a decarbonization system such as the system 19 described hereinbefore connected between the sump and pump may be employed exclusive of the refrigeration system to facilitate controlled atmosphere storage.

The following are illustrative examples of the operation of the invention:

Approximately 930,000 lbs. of Bartlett pears were placed in a CA storage room maintained at 32° F. and the room sealed. After 41 hours, the $CO_2$ level in the room had reached 2.0% and the fruit respiration rate was about 0.0020 lb. $CO_2$ per 1,000 lbs. fruit per hour. The decarbonator was turned on at a flow rate of 50 g.p.m. of refrigerating fluid and operated continuously. The $CO_2$ level in the room atmosphere rose as desired to a value of 3.7 to 3.8% over a period of six days and held at approximately these values for the next eight days. During this latter period, the amount of $CO_2$ removed by the decarbonator approximated 0.00086 lb./1,000 lbs. fruit per hour. At the end of this period as result of the gradual decrease in oxygen concentration in the room atmosphere, it became necessary to throttle the flow through the decarbonator. After 14 days when the $O_2$ level had reached the desired level of 3%, flow through the decarbonator had been throttled to a flow rate of 36 g.p.m. and the amount of $CO_2$ removed by the decarbonator reduced to 0.00064 lb. $CO_2$/1,000 lbs. fruit per hour. When the room was opened after 42 days total operation as CA storage rooms, odor of both fruit and room was essentially that of the fresh fruit, showing that the decarbonator was effective in removing from the room the obnoxious odors found in rooms operated on the lye scrubbing system.

Approximately 960,000 lbs. of pears were placed in a CA room maintained at 32° F. and the room sealed. After six hours, the $CO_2$ level in the room had reached 2.0% and the fruit respiration rate was about 0.0022 lb. $CO_2$/1,000 lbs. fruit per hour; the room having been closed up but not sealed over the weekend prior to sealing. The decarbonator was turned on at a flow rate of 100 g.p.m. and operated continuously. After 7 days, during which the $CO_2$ level in the room was held at between 2.0 and 2.2%, the rate of pear respiration had dropped off sufficiently so that it was necessary to throttle the decarbonator feed rate. After 19 days, the room had reached equilibrium and the $CO_2$ level was held within the range of 2.0 to 2.2% at a decarbonator fluid feed rate of 70 g.p.m. for the remainder of the storage period. When the room was opened after 30 days total operation as CA storage rooms, odor of both fruit and room was essentially that of the fresh fruit, showing that the decarbonator was effective in removing from the room the obnoxious odors found in rooms operated on the lye scrubbing system.

The method disclosed herein thus provides distinct advantages in the operation of controlled atmosphere storage rooms in that continuous decarbonization of refrigerating fluid and close control of the carbon dioxide level in the room atmosphere is accomplished with a minimum of attention by personnel and without the problems of time, labor, hazards, and cost of lye scrubbing.

What is claimed is:

1. In a method of operating a sealed cold storage room containing perishable ripening fresh foodstuff in which is provided a controlled atmosphere at a low temperature approaching 32° F. having an elevated carbon dioxide content in the range of about 2 to 6% and a reduced oxygen content in the range of about 2 to 8% selected to reduce the rate of ripening of said perishable foodstuff, the steps comprising continuously circulating an aqueous medium cooled to a temperature of about said low temperature approaching 32° F. and circulating the atmosphere of said cold storage room into intimate counterflow contact with said cooled aqueous medium and to absorb carbon dioxide produced by said perishables and odorous materials therefrom, continuously withdrawing a portion of said aqueous medium containing carbon dioxide and odorous materials from said cold storage room, continuously intimately mixing fresh atmospheric air with said withdrawn portion of aqueous medium and separating said air from said medium, whereby carbon dioxide and odorous materials are desorbed and separated from said aqueous medium, and then recycling said aqueous medium to be combined with said aqueous fluid medium which is continuously circulated in said cold storage room, said portion of circulating aqueous medium being withdrawn and recycled at a rate regulated to maintain the carbon dioxide content of said atmosphere at a selected content in the range of about 2 to 6%.

2. The method as defined in claim 1 wherein the amount of said aqueous medium withdrawn from said cold storage room and subjected to carbon dioxide desorption is regulated to continuously balance the net rate of carbon dioxide removal from said room with the rate of carbon dioxide produced by said ripening foodstuff thereby to maintain said selected carbon dioxide content of the atmosphere in said cold storage room.

3. In a method of operating a sealed cold storage room employed for the storage of respiring ripening perishable fresh fruit in which is provided an atmosphere having a carbon dioxide content in the range of about 2 to 6% and an oxygen content in the range of about 2 to 8% selected to control the rate of ripening of said fruit, the steps comprising continuously circulating an aqueous refrigerant medium over a cooled refrigerating surface and into intimate counterflow contact with said atmosphere in said cold storage room to cool said atmosphere to a temperature approaching 32° F. and absorb carbon dioxide produced by said fruit and odorous materials therefrom, continuously withdrawing a portion of the circulating aqueous refrigerant medium from said cold storage room, degassing carbon dioxide and odorous materials from said portion of medium by intimate contact with and separation from fresh atmospheric air, and returning said degassed medium to merge with said circulating medium in said cold storage room, said portion of circulating medium being withdrawn and returned at a rate regulated to maintain the carbon dioxide content of said atmosphere at selected content in said range of about 2 to 6%.

4. The method as defined in claim 3 wherein said operation of intimately contacting fresh atmospheric air with said portion of medium is effected in a venturi eductor mixing zone.

5. The process as defined in claim 3 wherein said aqueous refrigerant medium is water.

6. The process as defined in claim 3 wherein said aqueous refrigerant medium is a non-toxic aqueous brine solution.

References Cited in the file of this patent

UNITED STATES PATENTS

| | | |
|---|---|---|
| 2,065,358 | Zarotschenzeff | Dec. 22, 1936 |
| 2,127,571 | Pardee | Aug. 23, 1938 |
| 2,720,280 | Doyle | Oct. 11, 1955 |
| 2,798,570 | Kelley | July 9, 1957 |
| 2,952,993 | Bosworth | Sept. 20, 1960 |

FOREIGN PATENTS

| | | |
|---|---|---|
| 478,679 | Canada | Nov. 20, 1951 |